United States Patent [19]

Gabriel et al.

[11] Patent Number: 4,700,541
[45] Date of Patent: Oct. 20, 1987

[54] SHAPE MEMORY ALLOY ACTUATOR

[75] Inventors: Kaigham J. Gabriel, Fair Haven; William S. N. Trimmer, Belle Mead; James A. Walker, Howell, all of N.J.

[73] Assignee: American Telephone and Telegraph Company, AT&T Bell Laboratories, Murray Hill, N.J.

[21] Appl. No.: 919,788

[22] Filed: Oct. 16, 1986

[51] Int. Cl.$^4$ .............................................. F03G 7/06
[52] U.S. Cl. ...................................... 60/528; 60/527; 337/140; 415/33
[58] Field of Search .................... 60/527, 528, 529; 337/140; 415/30, 33

[56] References Cited

U.S. PATENT DOCUMENTS 4,010,455  3/1977  Stange ............................. 60/527 X
4,553,393  11/1985  Ruoff ................................. 60/528

OTHER PUBLICATIONS

"Application of Shape Memory Alloy to Robotic Actuators", J. Robotic Systems, Hashimoto et al., 1985, pp. 3-25.

"Tactile Detection Performed by SME Actuator", Bull. Japan Soc. of Prec. Engg., vol. 18, No. 3, Honma et al., 1984, pp. 274-276.

Primary Examiner—Stephen F. Husar
Attorney, Agent, or Firm—Jerry W. Herndon

[57] ABSTRACT

An electrically controlled shape memory alloy actuator capable of being miniaturized for use in robotics and other fields. The actuator is made of a shape memory alloy wire which is torsioned end along its longitudinal axis and with its ends constrained against movement. A lever or other suitable element is attached to the wire at a desired point other than at a wire end. A plurality of electrical connections spaced along the wire define a plurality of different sections of the wire. The wire and attached control element is made to rotate by selectively applying voltages to the different sections of the wire to heat the individual sections.

18 Claims, 2 Drawing Figures

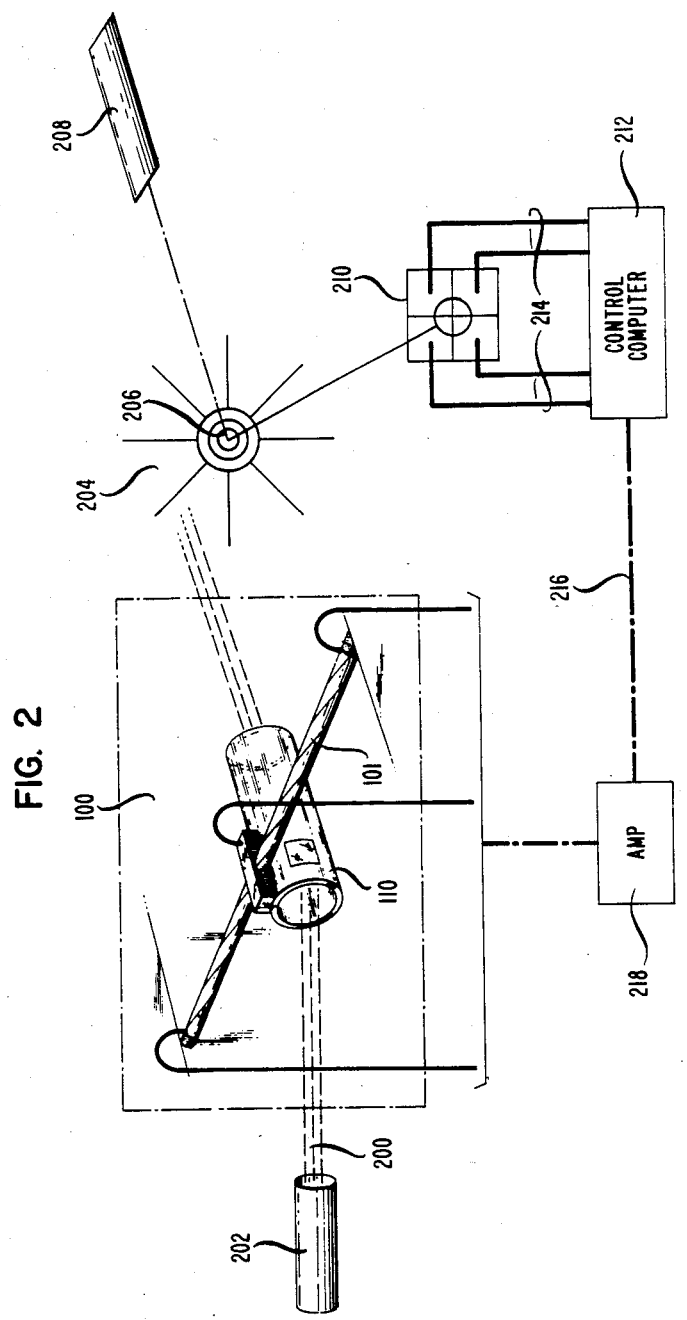

SHAPE MEMORY ALLOY ACTUATOR

TECHNICAL FIELD

The invention relates to actuating devices and particularly to miniature and microactuators made with electrically controlled shape memory alloy wire.

BACKGROUND OF THE INVENTION

Shape memory alloys (SMA) form a group of metals which have the interesting property that, when deformed while below a martensite finish temperature and then heated to above an austenite temperature, the alloy returns to its shape existing before the deformation. Actuating devices made with SMA technology for large scale applications are well known. Typical actuators employ a SMA member that is deformed in some manner and a return bias spring mechanically connected in some manner to the SMA device. When such a SMA device is heated, thermally or by other means, the actuator moves to perform some work function. The bias spring returns the actuator to its original position after cooling. Hashimoto et al discuss one example of this type of actuator with reference to FIG. 4a of their paper "Application of Shape Memory Alloy to Robotic Actuators", *Journal of Robotic Systems,* Vol. 2(1), March 1985.

A second type of actuator, called a differential type, uses two SMA devices connected mechanically in series. Heating of one device shrinks the apparatus in one direction while heating of the second device shrinks the apparatus in the other direction. Actuators of the bias and differential types have been applied to such macro applications as controlling movement of robotic joints.

Homna et al have attempted to apply SMA technology to microactuator technology by using thin (0.2 mm diameter) SMA wire and by heating the wire with pulsed electrical current. Their efforts are discussed in two papers, "Digital Actuator Applied Shape Memory Effect," *Transactions of the Japan Society of Mechanical Engineers,* Vol. 49, pp. 2163–2169, 1984, and "Tactile Detection Performed by SME Actuator", *Bulletin of the Japan Society of Precision Engineering,* Vol. 18, September 1984, pp. 274–276,. These microactuators use bias springs to return the SMA portion of an actuator to its deformed state after cooling. The use of such bias springs in microtechnology is undesirable because of the physical size requirements imposed, among other things, by the biasing device, and because of slow time constants associated with cooling.

SUMMARY OF THE INVENTION

An advance is made in the art in an actuator comprising a wire made of a shape memory alloy (SMA). The wire is torsioned about its longitudinal axis, and the ends of the wire are constrained against movement. A control member is attached to the wire at a prescribed point. A plurality of electrical connections to the wire define different longitudinal sections of the wire to which voltages may be applied to heat the sections selectively. This allows the sections of the SMA wire to work in opposition to one another, in response to the rapid heating and cooling of the respective sections. The result is controllable rotation of the wire and the control element.

Apparatus for identifying the position of the control member may be included. In one embodiment, an optical reflector is positioned on the control member for reflecting a beam of coherent light onto an optical detector.

In the disclosed embodiment, first, second and third electrical connections on the SMA wire partition the wire into two substantially equal-length sections. The third electrical connection is located at the midpoint between the first and second connections with the control member being attached to the wire at approximately the location of the third connection. Separate controllable voltage sources are connected to the two sections, with the third connection being common to the voltage sources to thereby control rotation of the control member. Selective heating of the individual wire sections is used both to operate the actuator and to return it to its rest position. Because of this the response time is faster than bias spring SMA devices which use cooling (with a greater time constant) to return to a rest position.

In one application of the actuator, the control member is a hollow air directing tube. An air jet is positioned such that an air stream enters the hollow interior of the control member. An air driven turbine is positioned such that its operation is controlled by the air stream emerging from the control element as the control element is rotated. This application employs apparatus for detecting the angular velocity of the turbine and for controlling the position of the control member in response to the angular velocity of the turbine. By way of example, the velocity detecting apparatus includes optical means located on the turbine for generating a rotating beam of light in synchronism with the rotation of the turbine and a transducer for converting the rotating beam of light into an electrical signal or signals. The means for controlling the position of the control member includes a computer or other control apparatus responsive to the electrical signals from the transducer for generating the actuator position control signals.

The actuator summarized above is particularly suitable for use in microtechnology, although the actuator is applicable to large scale applications as well.

BRIEF DESCRIPTION OF THE DRAWING

In the Drawing,

FIG. 2 shows the actuator in an illustrative application in which it is used to control the direction of a stream of air for driving a turbine.

DETAILED DESCRIPTION

Figure 1:
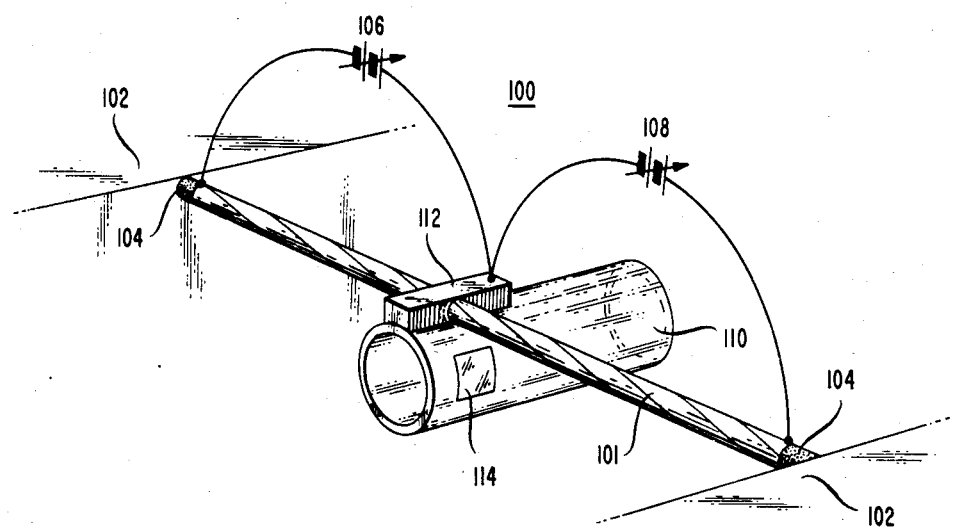
FIG. 1 shows the details of an actuator made according to the principles of the invention.

FIG. 1 shows the details of an illustrative actuator 100. A thin wire 101 made of a shape memory alloy, preferably nitinol (a tin and nickel alloy), is torsioned about its longitudinal axis and bonded to a support structure 102 in its torsioned state. Although not necessary for operation, in the preferred embodiment heat insulators 104 are bonded between the ends of the wire and the support structure. This arrangement improves heat time response for a given heating current, but slows cooling time response because the heat is dissipated more slowly. A plurality of variable voltage sources are electrically connected to different sections of the wire. In the embodiment of FIG. 1, two such sources 106 and 108 are electrically connected to left and right halves of the wire, respectively.

A control member 110 is bonded to the wire at any desired point, depending on the application intended for the actuator. By way of example, control element 110 is attached to wire 101 at approximately its midpoint in FIG. 1. In this example, the means of attaching the control element 110 to the wire also forms a common midpoint electrical contact for the voltage sources 106 and 108. Specifically, a metal contact 112 is bonded to the control member 110. The contact 112 is electrically attached to the shape memory alloy wire 101 and the voltage sources are electrically connected to contact 112.

The control element 110 is made to rotate in a plane perpendicular to the longitudinal axis of wire 101 by selectively heating different sections of the wire. This is accomplished by varying the voltages to the different wire sections. The resulting current flowing through the section of the wire 101 heats the wire section and causes that portion of the wire to attempt to return to its untorsioned state. Since the fixed wire ends cannot rotate, wire 101 and control element 110 rotate instead. Specifically, wire 101 is made to rotate downward in FIG. 1 by applying a voltage from source 106 to the left half of the wire. When this voltage is removed, the position of wire 101 and control element tend to remain in the rotated position. Application of a voltage from source 108 heats the right half of wire 101 causing it to return to its original state. A reflective surface 114 may be affixed to or deposited onto the control member 110, if desired, and used with an optical beam generator and detector to determine the position of the control member.

We find that a twist of approximately 3 revolutions per centimeter of wire length gives satisfactory results for an actuator wire of 0.003 inch in diameter. With such an arrangement, we have achieved a rotational arc of control element 110 of better than 180 degrees, using a driving current in the wire of approximately 250 milliamperes. The response time required to move control element 110 from one quiescent position to another is in the order of 100 milliseconds with this illustrative configuration.

FIG. 2 depicts an illustrative application for the arrangement of FIG. 1 in which rotation of control element 110 is used to redirect the direction of an air stream 200 from a jet 202. The redirected air stream is used to control the operation of an air turbine 204. The end of the shaft 206 of turbine 204 is equipped with an optically reflective surface mounted obliquely with respect to the cross-sectional surface of the shaft. An optical laser 208 directs a beam of light to the reflective surface. As turbine 204 rotates, the light reflected from the end of the turbine shaft rotates in a circle the radius of which is determined by the obliqueness of the reflective surface to the end of the shaft 206. A light sensitive detector may be used to sense the speed of rotation of turbine 206 at any given time. We illustratively use an optical quadrant detector 210 in FIG. 2 as the detector. Quadrant detectors modules S1671 and S1557, available from Hamamatsu Corporation, Bridgewater, N.J., are suitable for this application. A control computer 212 monitors the individual outputs 214 of the quadrant detector and generates actuator control signals on output leads 216. These control signals are amplified by amplifier 218 to sufficient voltage levels to directly control the actuator 100 in accordance with the principles described above. We find that we are able to more convenienty control rotation of control element 110 by using pulse width modulated signals on leads 216, because of the digital nature of the computer-controlled feedback.

It is understood that the above-described arrangements are illustrative of the application of the principles of the invention, and that other arrangements may be devised by those skilled in the art without departing from the spirit and scope of the invention. For example, it is clear that resolution of control of actuator 100 may be improved by applying control voltages to more than two sections of the actuator wire 101. Moreover, the selectively controlled sections may occupy completely different sections of wire 100 or they may overlap in any desired manner, depending on the application for which the actuator is to be used. In addition, the control member 100 need not be an air directing tube as shown in FIGS. 1 and 2, but may also be a lever, tongs, or any other type of actuating device dependent upon the application.

We claim:

1. An actuator comprising:
   a wire made of a shape memory alloy, the wire being torsioned about its longitudinal axis and the ends of the wire being fixed to a support structure;
   a control member attached to the wire at a prescribed point; and
   a plurality of electrical connections to different longitudinal sections of the wire to which voltages may be selectively applied, thereby to rotate the wire and control element.

2. The apparatus of claim 1 further comprising means for indicating the rotated position of the control member.

3. The apparatus of claim 2 wherein the position indicating means comprises:
   optical reflecting means located on the control member for reflecting a beam of light.

4. The actuator of claim 1 comprising:
   a first electrical connection;
   a second electrical connection;
   a third electrical connection located between the first and second connections;
   the three connections defining first and second sections of the wire; and
   the control member being attached to the wire at approximately its midpoint.

5. The actuator of claim 1 further comprising heat insulators located between the ends of the wire and the support structure.

6. The apparatus of claim 1 wherein the wire is made of a tin and nickel alloy.

7. The apparatus of claim 1 wherein the control member is a lever.

8. The apparatus of claim 1 wherein the control member is a hollow air directing tube.

9. A mechanical actuating system comprising:
   a wire made of a shape memory alloy, the wire being torsioned about its longitudinal axis and the ends of the wire being constrained against movement;
   a control member attached to the wire at a prescribed point; and
   means for selectively applying control voltages to different longitudinal sections of the wire to rotate the wire and control element.

10. The system of claim 9 further comprising:
    sensing means for generating electrical signals indicating the rotated position of the control element.

11. The system of claim 10 further comprising:

control means responsive to the position signals for generating the control voltages.

12. The system of claim 11 wherein the sensing means comprises:
   optical reflecting means on the control element for reflecting a beam of light.

13. The system of claim 12 wherein the sensing means further comprises:
   optical beam detecting and transducing means.

14. The system of claim 10 wherein the control means comprises:
   a software controlled computer responsive to the electrical position signals from the sensing means for selectively applying control voltages to the different wire sections of the actuator.

15. The system of claim 9 wherein the control member is a hollow tube, and wherein the system further comprises:
   a source of a stream of air positioned such that the air stream enters the hollow interior of the control member;
   an air driven turbine positioned such that its operation is controlled by the air stream emerging from the control element as the control element is rotated.

16. The system of claim 15 further comprising:
   means for detecting the angular velocity of the turbine; and
   means for controlling the position of the control member in response to the angular velocity detecting means.

17. The system of claim 16 wherein the angular velocity detecting means comprises:
   means located on the turbine for generating a rotating beam of light in synchronism with rotation of the turbine; and
   means responsive to the rotating beam of light for generating the actuator position control signals.

18. The system of claim 9 wherein the means for selectively applying voltages to the wire sections further comprises:
   means for applying a voltage to a first wire section to rotate the control element in a first direction from a rest position; and
   means for applying a voltage to a second wire section to return the control element to its rest position.

* * * * *